United States Patent
Sebö

(10) Patent No.: US 11,666,036 B2
(45) Date of Patent: Jun. 6, 2023

(54) EXPANDER HARNESS

(71) Applicants: JULIUS-K9 LLC, Tampa, FL (US); JULIUS-K9 Zrt., Szigetszentmiklós (HU)

(72) Inventor: Gyula Sebö, Szigetszentmiklós (HU)

(73) Assignees: JULIUS-K9 LLC, Tampa, FL (US); JULIUS-K9 Zrt., Szigetszentmiklos (HU)

( * ) Notice: Subject to any disclaimer, the term of this patent is extended or adjusted under 35 U.S.C. 154(b) by 151 days.

(21) Appl. No.: 17/098,317

(22) Filed: Nov. 13, 2020

(65) Prior Publication Data
US 2022/0151205 A1   May 19, 2022

(51) Int. Cl.
*A01K 27/00* (2006.01)

(52) U.S. Cl.
CPC .................. *A01K 27/002* (2013.01)

(58) Field of Classification Search
CPC ................................... A01K 27/002
See application file for complete search history.

(56) References Cited

U.S. PATENT DOCUMENTS

| | | | | |
|---|---|---|---|---|
| 7,165,511 B1* | 1/2007 | Brezinski | ............. | A01K 27/002 119/792 |
| 2007/0044735 A1* | 3/2007 | Zimmerman | ........ | A01K 27/002 119/856 |
| 2012/0024239 A1* | 2/2012 | Forbes | ................. | A01K 13/006 119/863 |
| 2013/0327282 A1* | 12/2013 | Sebo | .................... | A01K 27/006 119/850 |
| 2014/0299073 A1* | 10/2014 | Batista | ................. | A01K 27/008 119/856 |
| 2017/0326389 A1* | 11/2017 | Vergara | .............. | A62B 35/0006 |

* cited by examiner

*Primary Examiner* — Monica L Perry
*Assistant Examiner* — Alanna K Peterson
(74) *Attorney, Agent, or Firm* — Hershkovitz & Associates, PLLC; Abe Herhskovitz

(57) ABSTRACT

An expander harness for walking pets on a leash, comprising a back part (3) equipped with a lining (2). A limiting element (10) is threaded through the leash connector (16) on the back part (3), which is fixed to the lining (2) by a limiting element fixing point (12) crossing the intersection of the axis line (9) and a separating axis line (9*a*).

The leash connector (16) on one side of the separating axis line (9*a*), and the at least one shoulder part connecting element (18) on the other side of the separating axis line (9*a*), are elastically displaced in the direction opposite to each other, moving away from each other to the extent of the stretching of the elastic element (11) threaded through the leash connector (16), extending between the leash connector (16) and the limiting element fixing point (12), and that of the shoulder part elastic element (21) threaded through the shoulder part connecting element (18).

29 Claims, 6 Drawing Sheets

EXPANDER HARNESS

The patent application relates to an expander harness for walking pets on a leash, comprising a back part equipped with a lining, to which a back strap equipped with a buckle portion is attached, and a limiting element fixed to the lining by a limiting element fixing point on the axis line, which is threaded through a leash connector suitable for connecting a leash, and furthermore there is a shoulder part element on both sides of the axis line, arranged symmetrically, surrounding the neck and/or chest of the dog, threaded through a shoulder part connecting element, and on the side of the shoulder part connecting element opposite to the shoulder part elements a shoulder part limiting element is fixed together with a shoulder part elastic element.

The leash connector and the shoulder part connecting element are elastically displaced, moving away from each other due to the stretching of the elastic element of the former and the shoulder part elastic element of the latter, and the order of their displacement is determined by the sizing of the softness, spring stiffness of the elastic element threaded through the leash connector and the shoulder part elastic element threaded through the shoulder part connecting element, while the length of their displacement is determined by the length of the limiting element, which is slightly bulging and the shoulder part limiting element. The spring strength of the elastic element ensuring the periodic displacement of the leash connector is lower than that of the shoulder part elastic element, thereby the small tuggings, vibrations resulting from the movement of the hand holding the leash and the shoulders of the animal are compensated by the stretching of the elastic element to the extent of the length of the limiting element, while the harness itself remains motionless. In the event of greater forces, the elastic element and the shoulder part elastic element dampen together the tugging and pulling forces acting when walking a pet on a leash.

In general, it can be stated that the elastic design of harnesses can greatly contribute to the comfort of both the dog or other pet and the owner walking it during the daily walks, due to the spring action in the direction opposite to each other.

The movement of the shoulders of the dog and the periodic movement of the person holding the leash result in micro-tuggings, which put a load on the joints and can make the healing of injuries difficult. These effects are collectively called HAVS, that is: Hand-Arm Vibration Syndrome.

The task of the expander harness is to implement a connection between two bodies of different weights, speeds and speed directions, that is the animal being walked and the person holding the leash, with the lowest possible maximum force. However, the stretching of the elastic elements acting as springs leads to fatigue in the material structure.

Fatigue results from cyclically repeated loading. Therefore, the stretching length of the elastic elements needs to be limited by stretching limiting elements.

Fatigue tests can be used to determine the optimum length of the elastic elements and limiting elements, which is a prerequisite for the elastic operation of the harness.

The elastic element of the expander harness shall be subjected to cyclic loading, and the amplitude of the load shall be greater than the elastic elongation section of the elastic element. The result of this determines the optimum length of the limiting element.

The fatigue of the elastic element of the expander harness, after a high number of load cycles, can be compared to the original properties in terms of the load-elongation diagram and the change in length.

These tests can be used to determine the load bearing capacity of the limiting element fixing point fixing the elastic element and the stretching limiting element to the lining.

The spring stiffness of the elastic element shall also be determined in order to optimize the extent of the stretching and to achieve the desired result. The dimension of spring stiffness is force/length, its unit of measurement is newton/meter (N/m).

The overuse, rapid failure of the expander harness can be prevented, furthermore a high number of fatigue cycles can be achieved, if the length of the stretching limiting element and the length of the elastic element are coordinated with each other and sized on the basis of the above tests.

Textile materials, especially elastomers, have specific force-elongation characteristics, elasticity is made up of three components:
  elastic elongation, which is governed by Hooke's law,
  delayed elongation, which is eliminated with the elimination of tension over time,
  permanent elongation, which results in a permanent increase in length upon the elimination of the force.

When an elastic element, for example elastomer is used in harnesses, it is recommended to be used in the lower load range to reduce permanent elongation.

In the prior art dog harnesses often contain elastic portions, but the joint presence of elastic elements and stretching limiting elements, and/or their sizing, and/or the control of elastic displacements acting in the opposite direction are not considered as a need or obvious consequence. It can be uniformly stated that the elastic materials optimal for use in dog harnesses are materials that do not follow Hooke's law, since their modulus of elasticity also depends on the load and the temperature, and their elongation changes under constant load as well.

In the prior art, an elastic dog harness is disclosed in U.S. Patent Application Publication No. US 2007/0034164 A1, wherein on the chest part of an elastic harness the continuity of the load-bearing (non-elastic) straps is interrupted by an elastic insert.

The dog harness of Zimmerman (U.S. Patent Application Publication No. US 2007/0044735 A1) has been developed for special use, for lifting dogs. Both patents refer only in general to the use of elastic straps, for added comfort, providing a form-fitting and comfortable design.

The chest harness with an elastic chest strap of the prior art goes beyond providing comfort, which would obviously result from an elastic design. The harness disclosed in Hungarian Patent Application Publication No. P1400100 A2 comprises an elastic portion on both parts of the chest strap running horizontally, surrounding the chest of the animal. An aim of that invention has been to implement an elastic chest harness that is suitable for securing four-legged animals, primarily dogs e.g., in a car, and at the same time is also of assistance during everyday walks. A chest strap of an elastic design and/or a design capable of elastic, dimensionally stable stretching over a given section, protecting the shoulder joints by limiting the stretching, absorbing the micro-vibrations, is advantageous primarily for leading the dog on a leash on a daily basis.

A disadvantage of the reference is that when leading the dog on a leash, the whole back part of the dog harness could be displaced, and that could disturb the dog. Periodic stretching is implemented only in the direction of the chest strap.

Another disadvantage is that the leash is attached to the leash connector at a distance from the elastic element, thereby when the leash is pulled, the animal can be certainly expected to feel the displacement of the leash and/or the elastic portion, or the whole dog harness at least on its back and chest.

The elastic element and the stretching limiting element according to the invention cannot be transferred to the line of a leash-holding end element, because the elastic element cannot withstand, in the long term, forces acting directly, from varying directions. In this design the leash connector would not be able to accommodate a limiting element and an elastic element simultaneously, it would wrinkle them as a result of the forces. The "D"-shaped ring used as the leash connector would turn out due to the forces. The invention does not allow the stretching of the elastic elements in the direction opposite to each other, in an expander-like manner.

U.S. Pat. No. 9,820,471 B2 discloses a chest harness with an elastic chest strap, providing an elastic solution combined with a stretching limiting element on the two sides of the chest strap on both sides of the axis line.

The leash connector is not affected by the elastic displacement of the chest strap. The elastic elements on the two sides of the chest strap operate in a coordinated manner, but the elastic element on one side cannot reach maximum stretching without the elastic element on the other side moving in the same direction simultaneously. The leash connector is not affected by the stretching and elastic displacement, and even the slightest tugging leads to the displacement of the saddle part or back part on the back of the dog, causing undesirable friction.

A disadvantage of the harnesses disclosed in the prior art is that the shoulder or chest straps and the leash connector are not affected simultaneously by the elastic displacement. The stretching of the various elastic parts is not coordinated in terms of order, direction and extent. The coordinated elastic connection of the leash connector and the shoulder part connecting element of the shoulder part element(s) located on the back of the dog, on the back part, their elastic displacement in the direction opposite to each other is not solved. The elastic displacement of the leash connector and the shoulder part connecting element in the direction opposite to each other, and especially the harmonization of their spring stiffness, their proper timing, order and the sizing of the elastic element and the shoulder part elastic element compared to each other are not developed in the prior art, and are not even considered as an obvious need or solution.

Thus, an aim of this invention is to dampen the microvibrations acting on the leash connector when walking a dog on a leash, by keeping the stretching of the elastic element under the fatigue limit, within the length of the limiting element, and to ensure that the back or chest of the animal is not irritated by the movement, friction of the back part and/or the elastic element. Another aim is to ensure that the leash connector performs its function, that is it withstands several times the weight of the dog in the event of unexpected forces, irrespective of the direction in which the forces act, and in addition, the leash connector should be elastically displaceable, most preferably, it should be the first element in time to be elastically displaced when forces are acting. Another aim is to provide an elastic design for the shoulder part element, and to make it capable of periodically repeated displacement in the direction opposite to the displacement of the leash connector. Another aim is to optimize the strength, length and/or width of the shoulder part elastic element, to determine the spring stiffness. Another aim is to ensure that a limiting element allows the displacement of the leash connector with minimal bulging on the back part, but without getting caught up on landmarks. Another aim is to provide a freely turning leash connector. Another aim is to provide a stretching endpoint by the bulging of the limiting element and/or by fixing together the limiting element and the lining, which maximizes the stretching of the elastic element.

It is a task to ensure that the minimal tuggings generated by the movement of the hand holding the leash are absorbed first by the elastic displacement and the elastic element of the leash connector, and that the task of dampening additional forces in excess of those is taken over by the shoulder part elastic element(s). Yet another aim is to analyse the forces acting on the leash connector through the leash in the case of pets, dogs of different sizes, and to determine the size of the forces acting on the area, if the leash is characterized not by a constant tightened state, but by periodical tightening and loosening, for example, when walking the animal.

Thus, the invention relates to an expander harness for walking pets on a leash, comprising a back part equipped with a lining, to which a back strap equipped with a buckle portion is attached, a belly strap fixed to the buckle portion, and a leash connector suitable for attaching a leash on the back part.

A limiting element is threaded through the leash connector, which is fixed to the lining by a limiting element fixing point crossing the intersection of the axis line and a separating axis line.

There is a shoulder part element on both sides of the axis line, arranged symmetrically, surrounding the two shoulders of the dog, threaded through at least one shoulder part connecting element, and there is at least one shoulder part limiting element and at least one shoulder part elastic element threaded through the shoulder part connecting element.

According to the development, the leash connector on one side of the separating axis line, and the at least one shoulder part connecting element on the other side of the separating axis line, are elastically displaced in the direction opposite to each other, moving away from each other to the extent of the stretching of the elastic element threaded through the leash connector, extending between the leash connector and the limiting element fixing point, and that of the shoulder part elastic element threaded through the shoulder part connecting element.

The order of the displacement of the leash connector and the shoulder part connecting element is determined by the sizing of the spring stiffness of the elastic element threaded through the leash connector and that of the shoulder part elastic element threaded through the shoulder part connecting element.

The length of the displacement of the leash connector and the shoulder part connecting element is determined by the length of the slightly bulging limiting element and the stretching endpoint thereof, and that of the shoulder part limiting element and the stretching endpoint thereof. The lining is preferably covered by a covering sheet.

In a preferred embodiment, the elastic element is formed in the continuation of the shoulder part elastic element, and the limiting element is formed in the continuation of the shoulder part limiting element on the axis line, and they are separated from each other by the limiting element fixing point. In this embodiment there is a stiffener in the middle portion of the back part, under the limiting element and the shoulder part limiting element.

In another preferred embodiment, the elastic element and the limiting element covering it are on the axis line, while there is a shoulder part elastic element and a shoulder part limiting element threaded through a shoulder part connecting element and fixed to the lining on each of the two sides of the back part, further away from the axis line, not touching it.

The solution according to the invention is described in detail below with reference to the figures, without limiting it to the exemplary embodiments:

Figure 1:
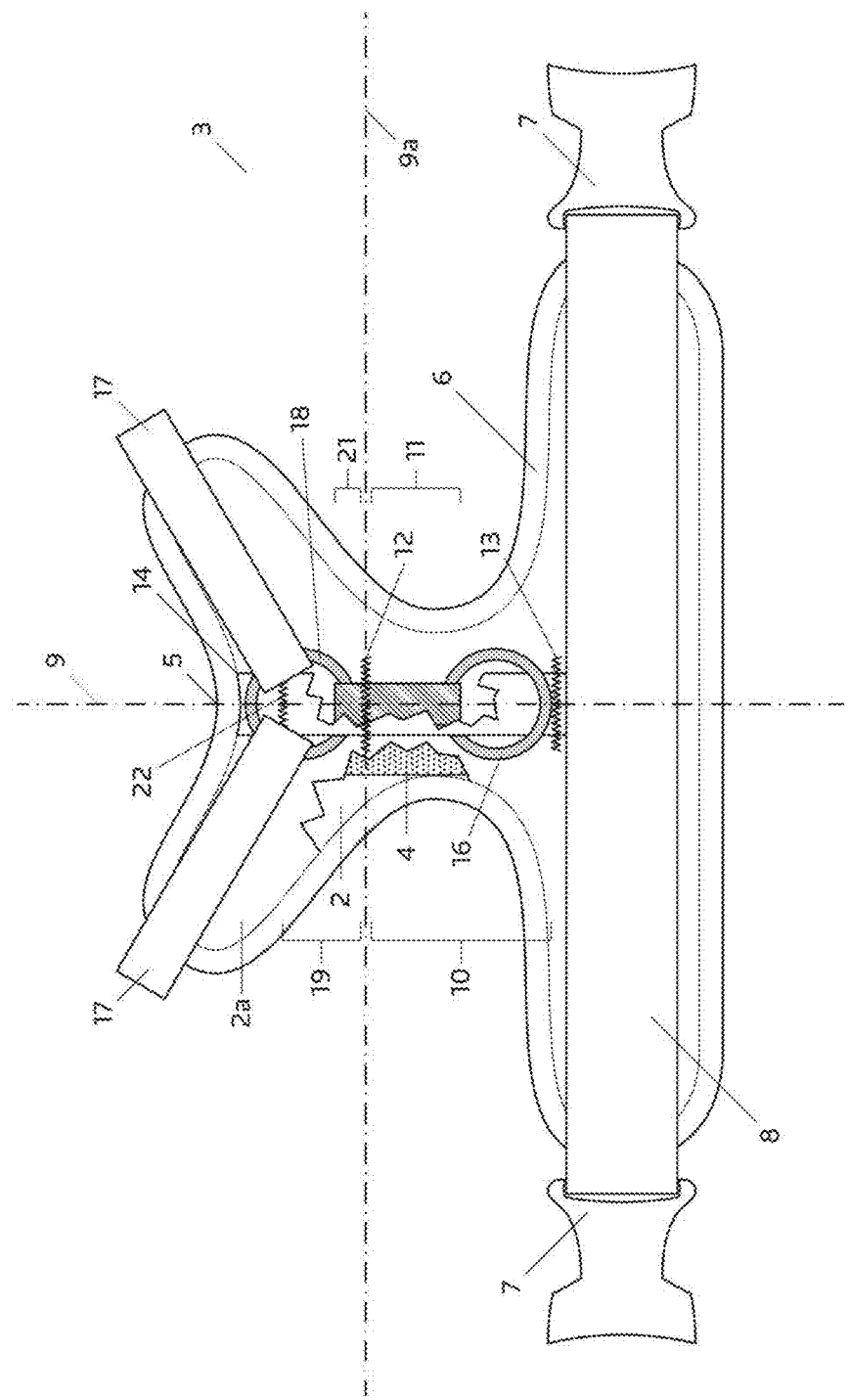
FIG. 1 shows a top view of the back part of the expander harness, within that the ratio of the elastic element and the shoulder part elastic element to each other in the local cross section of the limiting element and the shoulder part limiting element located on the axis line, and the stiffener is also shown in the local cross section of the covering sheet.
Figure 2:
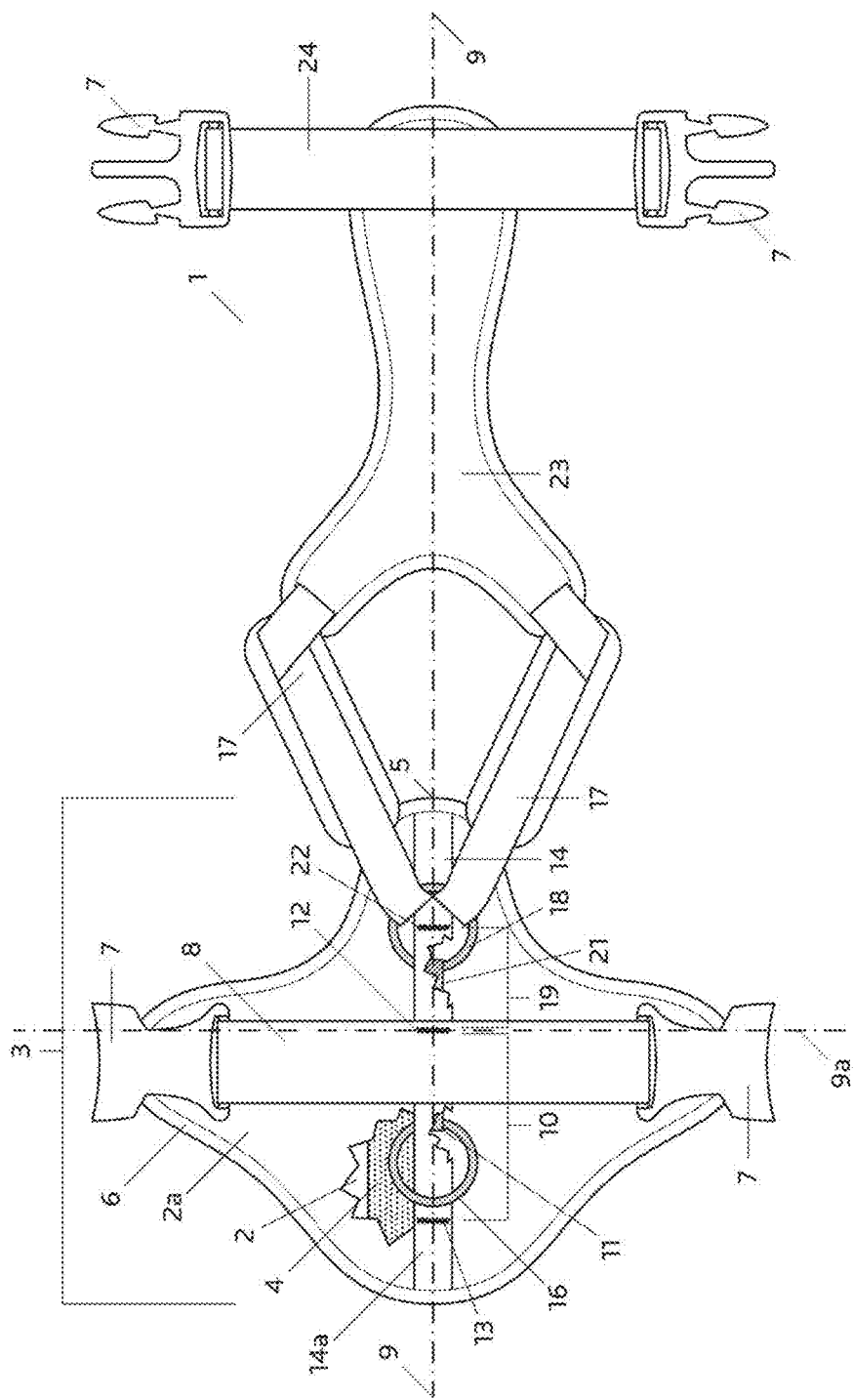
FIG. 2 shows the expander harness of FIG. 1, with the difference that here the back strap is between the leash connector and the shoulder part connecting element, and it also shows a top view of the other parts connected to the back part of the expander harness, the chest pad and the belly strap, in an outspread position.
Figure 3:
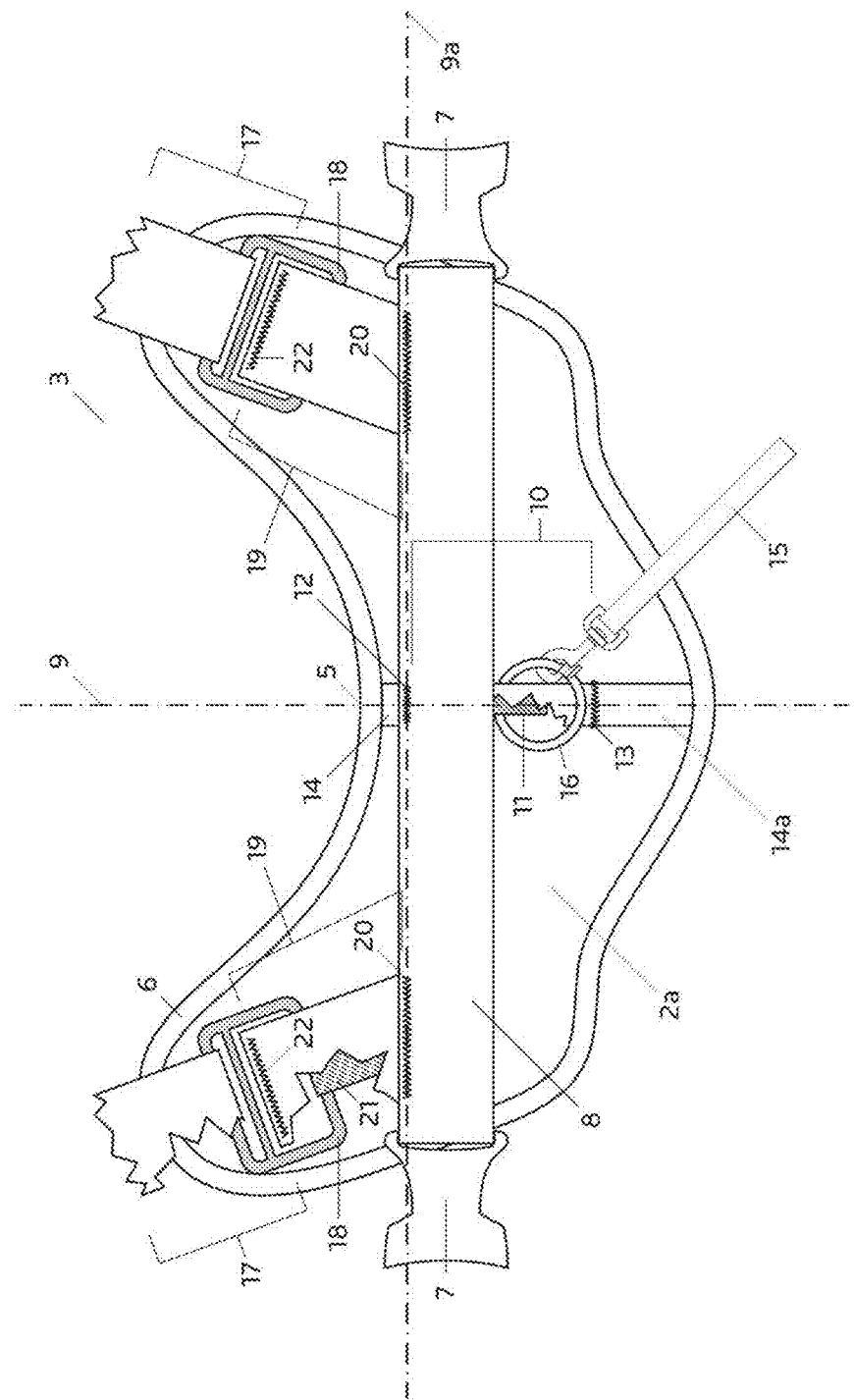

FIG. 3 shows a back part with an elastic element on the axis line and shoulder part elements different from the shoulder part elements shown in FIGS. 1 and 2 on both sides thereof, further away from the axis line, showing the shoulder part elastic element on one side in the local cross section of the shoulder part limiting element, and the shoulder part fixing point fixing it and the shoulder part stretching endpoint limiting the stretching thereof.

Figure 4:
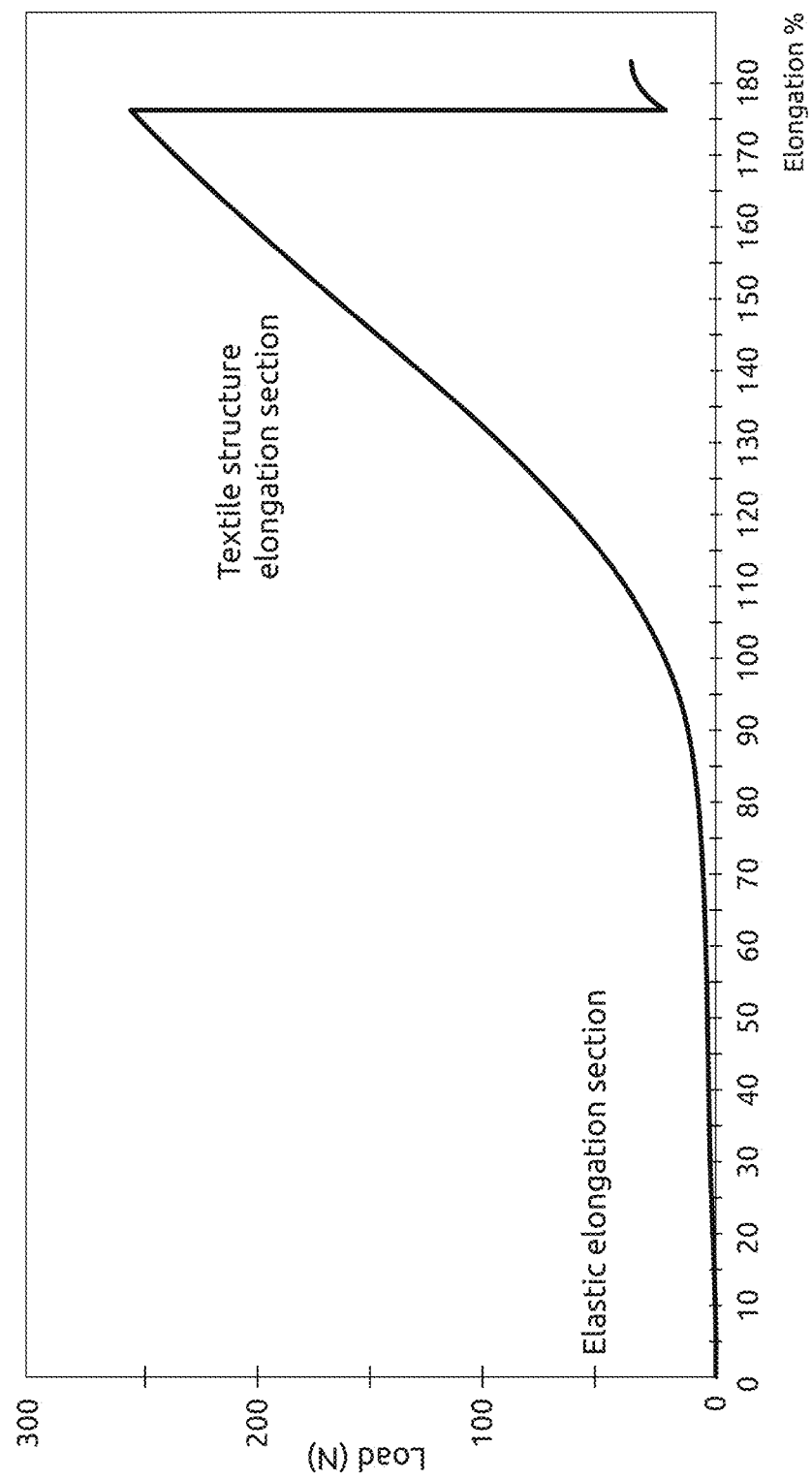

FIG. 4 shows the load-elongation diagram of a 10 mm wide elastic element, showing the breakpoint.

Figure 5:
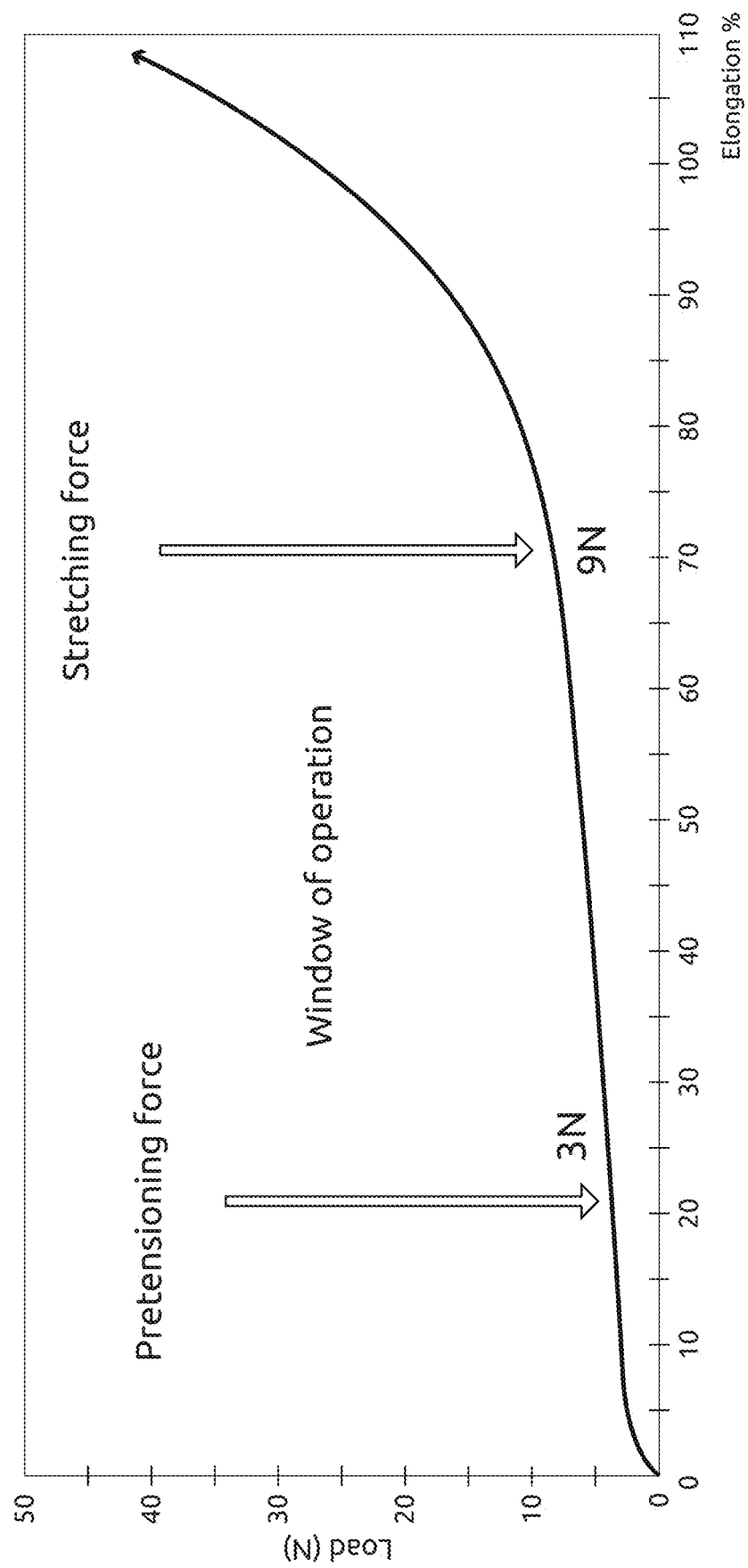

FIG. 5 shows the window of operation in the load-elongation diagram for a 10 mm wide elastic element.

Figure 6:
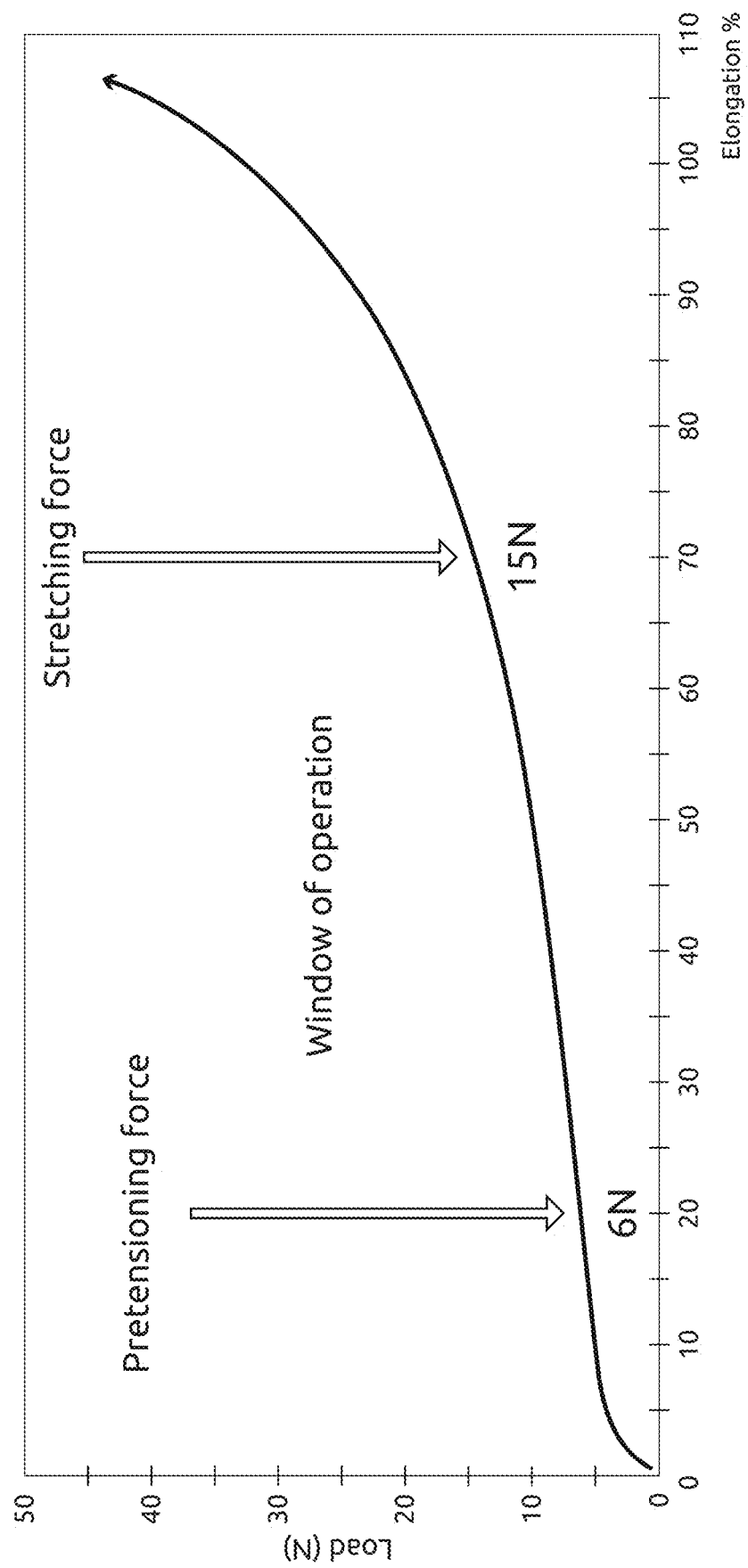

FIG. 6 shows the window of operation in the load-elongation diagram for a 13 mm wide elastic element.

FIGS. 1 and 2 show the elastic element 11 and the shoulder part elastic element 21 in the continuation thereof on the axis line 9, separated from each other by a limiting element fixing point 12, most preferably formed from a given elastic strap in the continuation of one another, folded back on themselves, fixed in the same limiting element fixing point 12. The width of the elastic element 11 and that of the shoulder part elastic element 21, measured perpendicularly to the axis line 9, is the same.

In this embodiment the limiting element fixing point 12 fixes simultaneously the shoulder part elastic element 21 and the shoulder part limiting element 19 determining the stretching length thereof, as well as the elastic element 11 and the limiting element 10 determining the maximum stretching thereof. The maximum stretching of the shoulder part elastic element 21 and that of the elastic element 11 separately, measured on the axis line 9, is less than 5 cm The elastic element reaches its maximum stretching under a minimum load of 20 N acting in the direction opposite to a spine line endpoint determined by the intersection of the axis line and the upper part of the back part. Under a minimum load of 2 kg, equivalent to 20 N acting in the direction opposite to the spine line endpoint, the elastic element of the expander harness presses against the limiting element at the stretching endpoint.

The limiting element fixing point 12 is formed closer to the shoulder part connecting element 18 than to the leash connector 16, thereby the elastic element 11 is longer and it has a softer spring action, a lower spring stiffness than that of the shorter shoulder part elastic element 21. The leash connector 16 moves in the direction opposite to a spine line endpoint 5 at a lower force than the shoulder part connecting element 18 in the direction of the spine line endpoint 5. As a result of the force acting on the leash 15, the leash connector 16 and the shoulder part connecting element 18 are elastically displaced on the axis line 9 in the direction opposite to each other.

The elastic element 11 is threaded through the leash connector 16 and folded back on itself, ending in the limiting element fixing point 12.

The leash connector 16 can turn freely in the elastic element 11, and the shoulder part connecting element 18 can also turn freely in the shoulder part elastic element 21, furthermore, the shoulder part connecting element 18 and the leash connector 16 have either a circular or an oval shape, thereby the wrinkling, deformation of the shoulder part elements 17 and/or the limiting element 10 can be excluded.

The length of the limiting element 10 is the distance between the limiting element fixing point 12 and a stretching endpoint 13, which also determines the maximum length of the stretching of the elastic element 11 in the direction opposite to the spine line endpoint 5. The stretching endpoint 13 is the end of the limiting element 10 on the side opposite to the spine line endpoint 5, and it can be a foldback of the strap forming the limiting element 10 and/or sewing, against which the leash connector 16 and the elastic element 11 embracing it press under maximum load, or into which they bump as a result of a sudden force. The limiting element 10 is closed by the stretching endpoint 13, and in this preferred embodiment it continues in a portion beyond the limiting element 14a and ends under an edging element 6. The stretching endpoint 13 is most preferably sewing, passing through the covering sheet 2a and the lining 2.

The portion beyond the limiting element 14a is in the continuation of the limiting element 10. The portion beyond the limiting element 14a forms a traversable loop resting flat on the covering sheet 2a between the edging element 6 and the stretching endpoint 13, suitable for attaching additional objects, technical equipment, torches. The portion beyond the limiting element 14a is perpendicular to the back strap 8. The full length of the limiting element 10 runs along the axis line 9. The covering sheet 2a covers 100% of the lining 2.

Shoulder part elements 17 are threaded through the shoulder part connecting element 18. There is one shoulder part element 17 on one side, and another on the other side of the axis line 9 on the back part 3 shown in FIGS. 1 and 2. On the back part 3 shown in FIGS. 1 and 2, the shoulder part elastic element 21 and the shoulder part limiting element 19 are on one side of a separating axis line 9a, while the elastic element 11 and the limiting element 10 are on the other side thereof. The separating axis line 9a passes through the limiting element fixing point 12, along the full length thereof. The limiting element fixing point 12 crosses the intersection of the axis line 9 and the separating axis line 9a.

The leash connector 16 is elastically displaced on the axis line 9, in the direction opposite to the spine line endpoint 5 by a maximum length determined by the limiting element 10, while the shoulder part element 17 is elastically displaced in the direction of the spine line endpoint 5 by a maximum length determined by the shoulder part limiting element 19, simultaneously or independently of each other. The smallest distance of the leash connector 16 and the shoulder part connecting element 18 from each other, measured on the axis line 9 in the rest state of the elastic element 11 and the shoulder part elastic element 21, is maximum 20 cm, and most preferably it is between 7 and 15 cm.

The length of the elastic element 11, measured on the axis line 9, is larger than the length of the shoulder part elastic element 21. In the rest state, the elastic element 11 is at least 10 percent longer than the shoulder part elastic element 21.

In this embodiment the length of the shoulder part limiting element 19 is the distance between the limiting element fixing point 12 and a shoulder part stretching endpoint 22, which gives the maximum length of the stretching of the shoulder part elastic element 21 in the direction of the spine line endpoint 5. The maximum stretching length of the shoulder part elastic element 21 is at least 10% shorter than the stretching length of the elastic element 11.

The back strap 8 passes across the back part 3 shown in FIGS. 1 and 2, and the two ends thereof end in a buckle portion 7.

In FIGS. 1 and 2 the limiting element fixing point 12 is preferably sewing passing through the covering sheet 2a, the lining 2 and the stiffener 4. The limiting element 10 and the shoulder part limiting element 19 are perpendicular to the back strap 8. The limiting element 10 ends under the back strap 8.

The elastic element 11 and the shoulder part elastic element 21 are shown in a local cross section of the limiting element 10 and the shoulder part limiting element 19. In this preferred embodiment the elastic element 11 and the shoulder part elastic element 21 are formed from one elastic strap in the continuation of one another, covered by the limiting element 10 and the shoulder part limiting element 19. The width of the elastic element 11 is maximum two-thirds of the width of the limiting element 10 measured perpendicularly to the axis line 9.

The width of the shoulder part elastic element 21 measured perpendicularly to the axis line 9 is maximum 90 percent of the width of the shoulder part limiting element 19 measured in the same direction. The lining 2 is covered by the covering sheet 2a on the side towards the elastic element 11.

The covering sheet 2a is preferably a waterproof, highly wear-resistant nylon fabric, as it is subjected to friction caused by the elastic element 11 and the leash connector 16 during normal operation. In this embodiment the lining 2 is a foamed material of a thickness between 2 and 5 mm. FIGS. 1 and 2 show the stiffener 4, preferably extending beyond the stretching endpoint 13 and the shoulder part stretching endpoint 22, in the local cross section of the covering sheet 2a. The stiffener 4 is fixed to the lining 2 and the covering sheet 2a by the limiting element fixing point 12, the stretching endpoint 13 and the shoulder part stretching endpoint 22. The stiffener 4 lines the elastic element 11 and the shoulder part elastic element 21 on the side towards the lining 2. The lining 2 lines the whole surface of the back part 3, and is covered by the edging element 6. The stiffener 4 is between the lining 2 and the covering sheet 2a. The area of the stiffener 4 is smaller than that of the lining 2.

The width of the stiffener 4 in the direction perpendicular to the axis line 9 is equal to or larger than the width of the limiting element 10. The width of the stiffener 4 is maximum 6 cm. The stiffener 4 is a flexible plastic plate of a maximum thickness of 2 mm, preventing the wrinkling of the covering sheet 2a due to the forces acting on the back part 3. On the side of the back part 3 towards the spine line endpoint 5, the stiffener 4 ends on the axis line 9 between the shoulder part stretching endpoint 22 and the edging element 6, not touching the line of the edging element 6.

On the side of the back part 3 opposite to the spine line endpoint 5, the stiffener 4 ends on the axis line 9 between the stretching endpoint 13 and the line of the edging element 6.

The shoulder part elastic element 21 remains in a rest state until the elastic element 11 of the leash connector 16 reaches its maximum stretching.

The leash connector 16 slides freely between the limiting element 10 and the covering sheet 2a up to the stretching endpoint 13, subjecting the surface thereof to friction. The stretching endpoint 13 is the end of the limiting element 10 in the direction opposite to the spine line endpoint 5.

The shoulder part connecting element 18 slides freely between the shoulder part limiting element 19 and the covering sheet 2a up to the shoulder part stretching endpoint 22. The leash connector 16 can turn freely 360 degrees in the limiting element 10 and the elastic element 11. The shoulder part connecting element 18 can turn freely 360 degrees in the shoulder part limiting element 19 and the shoulder part elastic element 21. The shoulder part limiting element 19 is formed between the limiting element fixing point 12 and the shoulder part stretching endpoint 22. The shoulder part limiting element 19, extending in the direction of the spine line endpoint 5, continues in an over-extending part 14.

In FIG. 1, the leash connector 16 and the elastic element 11, and the shoulder part connecting element 18 and the shoulder part elastic element 21 are located on the side of the back strap 8 towards the spine line endpoint 5.

FIG. 2 shows the expander harness 1 with the shoulder part elements 17 threaded through the shoulder part connecting element 18 connected to the back part 3, which shoulder part elements 17 are also connected to a chest pad 23 lining the chest of the animal from below. There is a belly strap 24 on the chest pad 23, equipped with a buckle portion 7. The shoulder part elements 17 are displaced together with the shoulder part connecting element 18 in the direction of the spine line endpoint 5 as a function of the stretching of the shoulder part elastic element 21.

On the back part 3 shown in FIG. 2, the back strap 8 is formed between the stretching endpoint 13 and the shoulder part stretching endpoint 22, separating them from each other, and touching the separating axis line 9a. The back strap 8 is located in a manner so as to separate the leash connector 16 and the shoulder part connecting element 18. In the solution shown in FIG. 2, the back strap 8 and the stiffener 4 reinforce together the dimensionally stable design during elastic operation, preventing the wrinkling of the lining 2 in the direction of the axis line 9 as a result of the stretching of the elastic element 11 and the shoulder part elastic element 21. The back strap 8 and the stiffener 4 prevent together the wrinkling of the lining 2 during operation. According to FIG. 2, the limiting element fixing point 12 is formed on the back strap 8.

FIG. 3 shows the back part 3 with a limiting element 10 and an elastic element 11 located on the axis line 9, and a limiting element fixing point 12 fixing both of them to the lining 2 and the back strap 8. The limiting element 10 and the elastic element 11 are both threaded through the leash connector 16. The limiting element 10 ends in the stretching endpoint 13, which can be a foldback of the limiting element 10 or, as in this preferred embodiment, sewing fixing the limiting element 10 to the covering sheet 2a. The limiting element 10 ends in the stretching endpoint 13, then, in the embodiment according to FIG. 3, it continues in a portion beyond the limiting element 14a in the continuation thereof. A leash 15 is connected to the leash connector 16.

In this preferred embodiment, there is a shoulder part limiting element 19 and a shoulder part elastic element 21, threaded through a shoulder part connecting element 18 on both sides of the axis line 9. Each shoulder part connecting element 18 has a rounded rectangle shape, and the shoulder part connecting elements 18 are arranged symmetrically on the two sides of the axis line 9. On the back part 3 shown in FIG. 3, the shoulder part elastic elements 21 and the shoulder part limiting elements 19 are on one side of the separating axis line 9a, while the elastic element 11 and the limiting element 10 are on the other side thereof. The separating axis line 9a passes through the limiting element fixing point 12, along the full length thereof. The limiting element fixing point 12 crosses the intersection of the axis line 9 and the separating axis line 9a. There is a shoulder part connecting element 18, a shoulder part elastic element 21 passing through it and a shoulder part limiting element 19 covering that on both sides of the axis line 9, operating simultaneously and/or independently of each other.

The leash connector 16 can turn freely 360 degrees in the limiting element 10 and the elastic element 11, preferably it has a circular or an oval shape, thereby protecting the limiting element 10 from wrinkling.

The shoulder part limiting element 19 is at least 10% narrower than the limiting element 10. The limiting element 10 and the shoulder part limiting elements 19 cross the back strap 8. The limiting element 10 is perpendicular to the back strap 8. The length of the shoulder part limiting element 19 is the distance between the shoulder part fixing point 20 and the shoulder part stretching endpoint 22, which gives the maximum length of the stretching of the shoulder part elastic element 21 in the direction of the spine line endpoint 5. The elastic element 11 is softer and/or longer than the shoulder part elastic element 21. The shoulder part limiting element 19 forms an angle of over 90 degrees with the back strap 8 open towards the over-extending part 14 on both sides of the axis line 9.

In the solution according to the invention the elastic element 11 and the shoulder part elastic element 21 have the same material structure. The elasticity/spring stiffness of the elastic element is determined by the width, length and strength of its material. The elastic elements are woven from elastomer yarns and textile warp yarns in such a way that during the weaving process the elastomer yarns are stretched more compared to the textile warp yarns. As a result, the elastomer yarns contract the elastic element in the unstretched state.

FIGS. 4-6 show the mechanical analysis, the load-elongation characteristics of the elastic element 11 and the shoulder part elastic element 21, in the description of FIGS. 4-6 the elastic element 11 and the shoulder part elastic element 21 are referred to collectively as elastic elements. The mechanical testing (the testing of the spring stiffness of the elastic element), analysis was conducted according to the textile testing methods developed for linear textiles.

The diagram in FIG. 4 shows the elongation (%), and breaking of a 10 mm wide elastic element under load (N).

The elastic elements incorporated into the expander harness can be considered as at least two damped linear springs of different stiffness connected in series, having an elastic elongation section and, as the load/force is increased, a textile structure elongation section lasting until the breakpoint.

The elastic elongation section lasts until the elastic element is stretched by 70-80%, then as the load/force is increased further, it is followed by the textile structure elongation section lasting until the breakpoint. For the tested elastic element the breakpoint occurred at an elongation of about 180%.

As it can be seen in FIG. 4, the stiffness of the two sections, the elastic elongation section and the textile structure elongation section, differ by orders of magnitude. During the weaving process of the elastic element, the elastomer yarns are stretched more, pretensioned compared to the textile warp yarns. The elastic element is contracted by the elastomer yarns in the unstretched state. When the elastic element is put under load, in the elastic elongation section, first the contracting effect of the elastomer yarns acting like a spring comes into action, then as the load is increased further, and the textile warp yarns are stretched, due to the stiffness of the textile being orders of magnitude higher, the force acting on the elastic element increases sharply.

In the expander harness according to the invention, the elastic elements are used only in their elastic elongation section.

FIG. 5 shows the window of operation of the elastic elongation section for a 10 mm wide elastic element. The elastic element incorporated into the expander harness 1 includes elastomer yarns pretensioned by 20% under a pretensioning force of 3 N. Based on our tests, the elastic element should be loaded only until it is stretched by 70% at most in order to ensure that it retains its elasticity in the long term, which corresponds to a stretching force of 9 N for a 10 mm wide elastic element. Therefore, the window of operation is preferably in the elongation range of up to 50%.

Pretensioning is definitely advantageous, because the permanent elongation of the elastic element during use is inevitable. The pretensioning force is on the one hand low, and on the other hand the elastic elements can be considered as elastomer springs connected in series, coming into action one after the other, thus starting from a zero load, the operation of the elastic element will not cause a sudden change in force. The change in load of the harness and the elastic elements is preferably adjusted to provide the longest window of operation possible. At the end of the window of operation, when the contracting effect of the pretensioned springs (elastomer yarns) woven into the band ceases, due to the stiffness of the textile being orders of magnitude higher, the force increases sharply. To prevent this, stiff limiting elements are incorporated for each elastic element of the expander harness.

The force range in which the elastic element will come into action can be changed by using elastic elements of different strengths/widths depending on the weight of the dog. As shown in FIG. 6, a 13 mm wide elastic element is pretensioned by 20% under a pretensioning force of 6 N and stretched by 70% under a stretching force of 15 N.

The size of the pretensioning force can be increased until the start of stretching becomes perceptible on the expander harness 1 and indirectly on the leash 15.

A stronger elastic element is stiffer, with an increase in elongation the increase in force is higher. With the incorporation of a longer elastic element the spring stiffness is reduced.

The load capacity of the elastic element according to FIGS. 4-6 should be chosen as a function of the weight of the dog. Heavier dogs, higher dynamic loads require a stronger elastic element with stiffer characteristics. The length of the limiting element 10 and the shoulder part limiting element 19 should be chosen so that the elastic elements (the elastic element 11 and the shoulder part elastic element 21) can retain their elasticity in the window of operation in the long term.

The sizing of elastic elements connected in series based on the above tests has not been implemented in the prior art.

The elastic element and the shoulder part elastic element of the expander harness according to the invention are in the rest state (unstretched) while no pulling force acts on the leash connector. Then the leash connector and the shoulder part connecting element are not displaced. When a pulling force acts on the leash connector, that is the owner pulls the leash in the direction opposite to the movement of the animal, the elastic element and the shoulder part elastic element of the expander harness stretch, and thereby the leash connector and the shoulder part connecting element move away from each other.

According to the solution according to the invention, the limiting element fixing point is formed closer to the shoulder part connecting element than to the leash connector, thereby the elastic element is longer and it has a softer spring action, a lower spring stiffness than that of the shorter shoulder part elastic element. The leash connector moves in the direction opposite to the spine line endpoint at a lower force than the shoulder part connecting element in the direction of the spine line endpoint.

The maximum length of the stretching of the elastic element is determined by the length of the limiting element, which is the distance between the limiting element fixing point and the stretching endpoint.

Under maximum load the leash connector and the elastic element embracing it press against, or as a result of a sudden force bump into the stretching endpoint.

The leash connector is elastically displaced on the axis line, in the direction opposite to the spine line endpoint by a maximum length determined by the limiting element, while the shoulder part connecting element is elastically displaced in the direction of the spine line endpoint by a maximum length determined by the shoulder part limiting element, simultaneously or independently of each other.

In response to a force, the shoulder part elastic element remains in the rest state until the elastic element of the leash connector reaches its maximum stretching.

The shoulder part connecting element moves freely up to the shoulder part stretching endpoint. The leash connector can turn freely 360 degrees in the limiting element and the elastic element. The shoulder part connecting element can turn freely 360 degrees in the shoulder part limiting element and the shoulder part elastic element.

The shoulder part element is displaced together with the shoulder part connecting element in the direction of the spine line endpoint as a function of the stretching of the shoulder part elastic element.

The solution according to the invention allows the achievement of the aims set.

LIST OF REFERENCE NUMBERS 1. expander harness
2. lining
2a. covering sheet
3. back part
4. stiffener
5. spine line endpoint
6. edging element
7. buckle portion
8. back strap
9. axis line
9a. separating axis line
10. limiting element
11. elastic element
12. limiting element fixing point
13. stretching endpoint
14. over-extending part
14a. portion beyond the limiting element
15. leash
16. leash connector
17. shoulder part element
18. shoulder part connecting element
19. shoulder part limiting element
20. shoulder part fixing point
21. shoulder part elastic element
22. shoulder part stretching endpoint
23. chest pad
24. belly strap

The invention claimed is:

1. An expander harness for walking pets on a leash, comprising a back part equipped with a lining, to which a back strap equipped with a buckle portion is attached, a belly strap fixed to the buckle portion, and a leash connector suitable for attaching a leash, having a limiting element threaded through it, which limiting element is slightly bulging and is fixed to the lining by a limiting element fixing point in the intersection of an axis line and a separating axis line, furthermore there is a shoulder part element on both sides of the axis line, arranged symmetrically, surrounding the two shoulders of the animal, threaded through at least one shoulder part connecting element, wherein at least one shoulder part limiting element and at least one shoulder part elastic element are also threaded through the shoulder part connecting element, and fixed to the lining, wherein the leash connector on one side of the separating axis line and the at least one shoulder part connecting element on another side of the separating axis line are elastically displaced in a direction opposite to each other as a result of force acting on the leash, that is move away from each other to the extent of the stretching of an elastic element threaded through the leash connector, extending between the leash connector and the limiting element fixing point, and that of the shoulder part elastic element threaded through the shoulder part connecting element, wherein the order of their displacement is determined by the sizing of the spring stiffness of the elastic element threaded through the leash connector and that of the shoulder part elastic element threaded through the shoulder part connecting element, while the length of their displacement is determined by the limiting element and a stretching endpoint thereof, and the shoulder part limiting element and a shoulder part stretching endpoint.

2. The expander harness according to claim 1, wherein the lining is covered by a covering sheet.

3. The expander harness according to claim 1, wherein on the axis line a stiffener is sewn together with the lining.

4. The expander harness according to claim 3, wherein the area of the stiffener is smaller than that of the lining.

5. The expander harness according to claim 3, wherein the limiting element is fixed to the stiffener by the stretching endpoint.

6. The expander harness according to claim 1, wherein the limiting element is fixed to the lining by the stretching endpoint.

7. The expander harness according to claim 1, wherein the shoulder part limiting element is fixed to the lining by the shoulder part stretching point.

8. The expander harness according to claim 1, wherein the spring stiffness of the elastic element is lower that the spring stiffness of the shoulder part elastic element.

9. The expander harness according to claim 1, wherein, in the event of maximum stretching, the elastic element reaches the stretching endpoint at a lower force than at which the shoulder part elastic element reaches the shoulder part stretching endpoint.

10. The expander harness according to claim 1, wherein the limiting element is longer than the shoulder part limiting element.

11. The expander harness according to claim 1, wherein in the rest state the elastic element is at least 10 percent longer than the shoulder part elastic element.

12. The expander harness according to claim 1, wherein the maximum stretching length of the shoulder part elastic element is at least 10% shorter than the stretching length of the elastic element.

13. The expander harness according to claim 1, wherein the shoulder part elastic element remains in the rest state until the elastic element of the leash connector reaches its maximum stretching.

14. The expander harness according to claim 1, wherein the maximum stretching of the shoulder part elastic element and that of the elastic element separately, measured on the axis line, is less than 5 cm.

15. The expander harness according to claim 1, wherein the elastic element reaches its maximum stretching under a minimum load of 20 N acting in the direction opposite to a spine line endpoint determined by the intersection of the axis line and the upper part of the back part.

16. The expander harness according to claim 15, wherein under a minimum load of 20 N acting in the direction opposite to the spine line endpoint the elastic element presses against the limiting element at the stretching endpoint.

17. The expander harness according to claim 15, wherein the shoulder part limiting element, extending in the direction of the spine line endpoint, continues in an over-extending part.

18. The expander harness according to claim 1, wherein the limiting element fixing point fixes both the shoulder part elastic element and the shoulder part limiting element limiting the stretching thereof, and the elastic element and the limiting element determining the maximum stretching thereof.

19. The expander harness according to claim 1, wherein the elastic element ends in the limiting element fixing point, then continues in the shoulder part elastic element made of the same elastic strap, in the continuation thereof.

20. The expander harness according to claim 1, wherein the width of the elastic element and that of the shoulder part elastic element, measured perpendicularly to the axis line, is the same.

21. The expander harness according to claim 1, wherein limiting element fixing point is formed between the shoulder part connecting element and the leash connector, separating them from each other.

22. The expander harness according to claim 1, wherein the shoulder part connecting element and the leash connector have a circular or an oval shape.

23. The expander harness according to claim 1, wherein the leash connector can turn freely in the elastic element, and the shoulder part connecting element can also turn freely in the shoulder part elastic element.

24. The expander harness according to claim 1, wherein the width of the elastic element is maximum two-thirds of the width of the limiting element measured perpendicularly to the axis line.

25. The expander harness according to claim 1, wherein the width of the shoulder part elastic element measured perpendicularly to the axis line is maximum 90 percent of the width of the shoulder part limiting element measured in the same direction.

26. The expander harness according to claim 1, wherein there is one elastic element on the back part, on the axis line, while there is one shoulder part elastic element on each of the two sides of the axis line, further away from the axis line.

27. The expander harness according to claim 26, wherein the shoulder part limiting element and the shoulder part elastic element are fixed to the lining by a shoulder part fixing point.

28. The expander harness according to claim 26, wherein the length of the shoulder part limiting element is determined by the shoulder part fixing point and the shoulder part stretching endpoint.

29. The expander harness according to claim 26, wherein the shoulder part stretching endpoint is formed within the outline of the shoulder part connecting element.

\* \* \* \* \*